(12) United States Patent
Pittman

(10) Patent No.: US 6,482,078 B1
(45) Date of Patent: Nov. 19, 2002

(54) SYSTEM FOR SEPARATION OF DEBRIS FROM SHOT BLAST MEDIA

(76) Inventor: James Pittman, Apartment 306, 415 Locust Street, Burlington, Ontario (CA), L7S 2J1

( * ) Notice: Subject to any disclaimer, the term of this patent is extended or adjusted under 35 U.S.C. 154(b) by 0 days.

(21) Appl. No.: 09/674,663
(22) PCT Filed: May 7, 1999
(86) PCT No.: PCT/CA99/00410

§ 371 (c)(1),
(2), (4) Date: Dec. 22, 2000

(87) PCT Pub. No.: WO99/58298

PCT Pub. Date: Nov. 18, 1999

(51) Int. Cl.$^7$ .............................................. B24C 9/00
(52) U.S. Cl. .......................................... 451/87; 451/88
(58) Field of Search ............................. 451/38, 39, 40, 451/75, 85, 87, 88, 89, 99, 102

(56) References Cited

U.S. PATENT DOCUMENTS

| 5,064,454 | A | * | 11/1991 | Pittman | 55/302 |
| 5,562,531 | A | * | 10/1996 | Yamaharu | 209/30 |
| 5,566,421 | A | * | 10/1996 | Pittman | 15/314 |
| 6,238,268 | B1 | * | 5/2001 | Wern | 451/36 |
| 6,254,462 | B1 | * | 7/2001 | Kelton et al. | 451/350 |
| 6,361,416 | B1 | * | 3/2002 | Hopkins et al. | 210/767 |

FOREIGN PATENT DOCUMENTS

| DE | 231814 | A | * | 3/1911 | | |
| DE | 4013584 | A1 | * | 10/1990 | | B24C/3/04 |
| DE | 4344947 | A1 | * | 8/1995 | | B24C/9/00 |
| EP | 0416711 | A1 | * | 3/1991 | | B24C/9/00 |

* cited by examiner

Primary Examiner—Joseph J. Hail, III
Assistant Examiner—David B. Thomas
(74) Attorney, Agent, or Firm—R. Craig Armstrong; Borden Ladnar Gervain LLP

(57) ABSTRACT

A system (1), for shot blasting of a surface, collecting used shot blast media and debris, and separating the debris from the shot blast, has at least one shot blast nozzle (105) with a hood (100) connected to a vacuum hose (110). The system further has a displacement chamber (200) with an inlet connected to the hood by the vacuum hose, an inlet baffle (220), a solid matter collecting and discharging area (205) for receiving solid matter which falls from the gas stream in the displacement chamber, an outlet baffle (225), an outlet (226) for the outgoing gas stream, and a rotary valve (510) for allowing discharge of the solid matter. A first filter unit (300) and a second filter unit (310) are connected to the displacement chamber via a first duct (230). A shot blast media container (600) is connected to a shot blast media feeding hose (120), which is connected to the shot blast nozzle. Further, a blower (400) creates suction of the gas stream from the shot blast nozzle to the displacement chamber, through the first filter unit and the second filter unit. A vibratory screen separator (500) is arranged adjacent the rotary valve and is arranged to separate used shot blast media from larger particles. A paint and dust filter (700) is connected between the first and second filter units and the displacement chamber, for filtering the filtrate from the filter units. The paint and dust filter utilizes the blower suction from the displacement chamber to suck the filtrate from the filter units.

6 Claims, 7 Drawing Sheets

SYSTEM FOR SEPARATION OF DEBRIS FROM SHOT BLAST MEDIA

TECHNICAL FIELD

This invention relates generally to a system for shot blasting and separating light particles from heavier particles in a gas stream and in particular to separating paint in the form of flakes, chips and dust from shot blast media.

BACKGROUND ART

In shot blasting of painted surfaces it is now essential to avoid the release of contamination to the environment via the used blasting media. The paint frequently contains lead or other toxic or undesirable elements. At the same time, it is essential to protect the shot blast operators and other workers from inhalation of the dust produced during the shot blast operation.

An apparatus for removing matter, such as asbestos, from a gas stream using a displacement chamber for separating coarse and fine material, and a filter system having two regenerative filters for trapping the fines, is disclosed in U.S. Pat. No. 5,064,454. At least two filter units are installed in parallel to receive and filter the gas stream. The filter units have outlets at the bottom for solid matter and first and second valves respectively on either side of each filter unit for cleaning by compressed air when desired. The displacement chamber is upstream of the filter units, with a solids removal opening at the bottom. The bottom outlets of the filters and the displacement chamber are sealed from the surrounding environment, and the filtered solid matter is discharged into bags via at least one bagging unit sealed to the outlets and the discharge opening. Third valves are provided at the solid matter outlet of each filter unit, and these outlets are connected back to the displacement chamber via a return conduit. Fourth valves from the filter units are connected to a higher pressure gas source, such as the atmosphere in a vacuum system, so that the solid matter may be routed back to the displacement chamber by closing the first and second valves and opening the third and fourth valves. A ram compresses the coarse material collected at the bottom of the displacement chamber whilst the fines collected in the filter system are preferably recycled into the bottom of the displacement chamber during cleaning of the filters. If the gas stream contains toxic material, such as toxic paint chips, the toxic material will be recycled from the filters to the displacement chamber until a hazardous concentration of toxic material in the system is reached. The compressed coarse material is bagged for disposal.

The above described system works best for applications where most of the collected material comprises a large volume of toxic material which is to be disposed of, for example asbestos removal. However, this clearly creates a disposal problem, and/or a cost problem, if the total volume of toxic material is small compared to the non-toxic volume of collected material. All of the collected material must be disposed of to an approved waste site, although only a part of the material is toxic. Since both toxic and non-toxic material is mixed in the storage bags, all of the collected material requires special and costly disposal facilities. Furthermore, there is a relatively large quantity of material to be disposed, which in itself increases the cost of disposal.

To allow more than one shot blast hood to be connected to the displacement chamber without loss of vacuum to any of the hoods, a vacuum compensation valve, as disclosed in WO 94/22355 and U.S. Pat. No. 5,566,421, is utilized. Multiple hoses are connected to the displacement chamber for collection of materials from various locations (whether immediately adjacent each other, where the hoses may be ganged together if desirable, or whether at various locations remote from each other). Pressure sensors associated with each hose sense the pressure in the hose and dampers are employed, in response to the relative pressures between the hoses, to vary the effective area of the connection between the hose and the displacement chamber, so as to equalize and optimize the relative pressures. Preferably, conical plungers or stoppers which are movable towards and away from corresponding seats by linear actuators, are used as dampers. The dampers are preferably controlled by a programmable logic controller (PLC) which receives signals from the pressure sensors and is programmed to move the dampers to their optimum positions for the sensed pressures.

DISCLOSURE OF INVENTION

When the apparatus described above is used for cleaning an air stream carrying shot blast media, removed paint, rust etc. from a treated surface, the compressed coarse material will contain used shot blast media and coarser paint chips or flakes together with larger rust particles and other material that was shot blasted from the treated surface. An unnecessary large volume of material will have to be disposed of unless the still useable shot blast medium can be separated from the coarse material, such as possibly toxic paint chips, dust and rust flakes, and be reused. It is, therefor, an object of the invention to provide a suitable system for achieving the desired separation, within the context of an overall system which permits the shot blast media to be reused.

A further object of the invention is to provide a suitable system for removing toxic particles from the filter system, before the recycling of material builds up toxicity in the system to a hazardous level.

In the invention, a shot blast hood is connected to a shot blast media feeding hose and the hood is surrounded by a hood, which is connected to a vacuum source to collect all of the shot blast media, paint flakes, dust, etc. from the area where the shot blasting is taking place. The hose which collects the shot blast media, chips, dust, and other debris, is connected to a "displacement chamber". Several such hoses may be connected to the chamber, so that shot blasting may take place simultaneously at several different locations. Within the displacement chamber, a baffle is positioned to direct the incoming airstream downwardly, thus directing most of the debris downwardly. However, air is drawn off the top of the displacement chamber via at least one outlet, through high performance filters, by a blower unit which provides negative pressure to the whole system. This air carries most of the dust and "fines" which are particularly hazardous to health.

From the bottom of the displacement chamber, the shot blast material and heavy paint chips, etc. are discharged to a vibratory screen separator via a rotary valve. The vibratory screen separates the paint chips from the shot blast media, so that the shot blast media may be reused. The shot blast media may be reused several hundred times, making the successful separation desirable also for reducing cost. The paint chips are bagged for disposal.

From the displacement chamber, the dust-laden air is drawn to one of two filter units, a first filter unit and a second filter unit. Each filter unit includes several HEPA filters mounted vertically within a housing. Air is drawn through the filters via a duct leading from the clean side of the filters to the main blower unit.

When the filters in the first filter unit start to become clogged, as can be readily detected by gauges which measure the pressure drop across the filters, the first filter unit is taken off-line, and the airstream is directed through the second filter unit. Once the first filter unit is off-line, a valve is opened from the bottom of the first filter unit where much of the dust will have settled, to draw the dust to a paint and dust filter which is connected between the first filter unit and the displacement chamber. The paint and dust filter uses the negative pressure in the displacement chamber to draw the dust from the first filter unit through the paint dust filter. A small air inlet on the filter unit is opened to allow air into the first filter unit so that the dust can be drawn to the paint and dust filter. Once the first filter unit has been cleaned in this manner, the valve to the paint and dust filter is closed, and the dust can be removed from the paint and dust filter via a rotary valve at the bottom.

As the second filter unit becomes clogged, this process is repeated, but this time with the second filter unit being taken off-line and connected to the paint and dust filter while the first filter unit is back on-line.

Further features of the invention will be described or will become apparent in the course of the following detailed description.

BRIEF DESCRIPTION OF DRAWINGS

In order that the invention may be more clearly understood, the preferred embodiment thereof will now be described in detail by way of example, with reference to the accompanying drawings, in which.

BEST MODE FOR CARRYING OUT THE INVENTION

Figure 1:
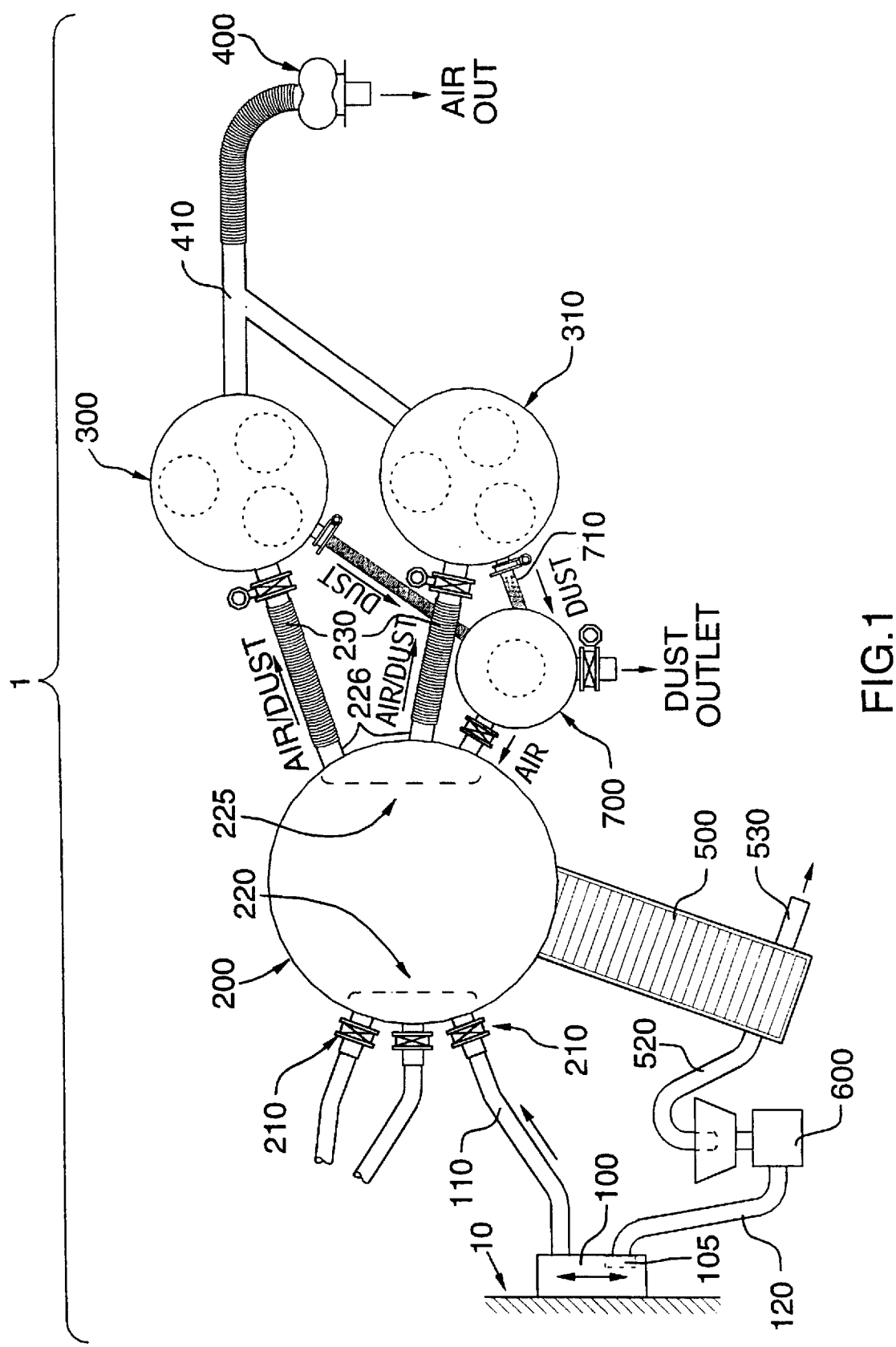
FIG. 1 is a schematic view of a system according to the invention.
Figure 2A:
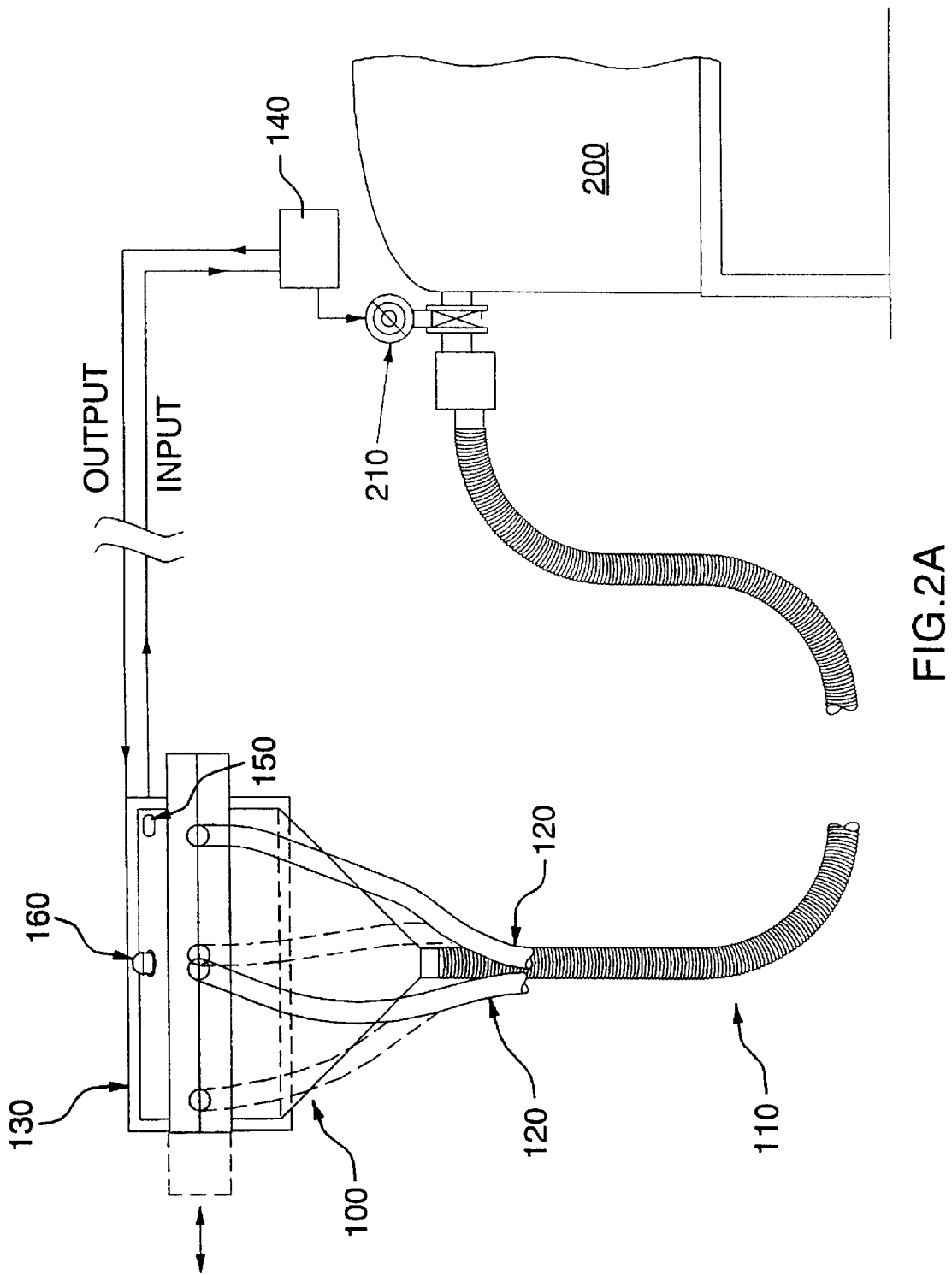
FIG. 2A is a schematic view of the shot blast hood and the displacement chamber.
Figure 2B:
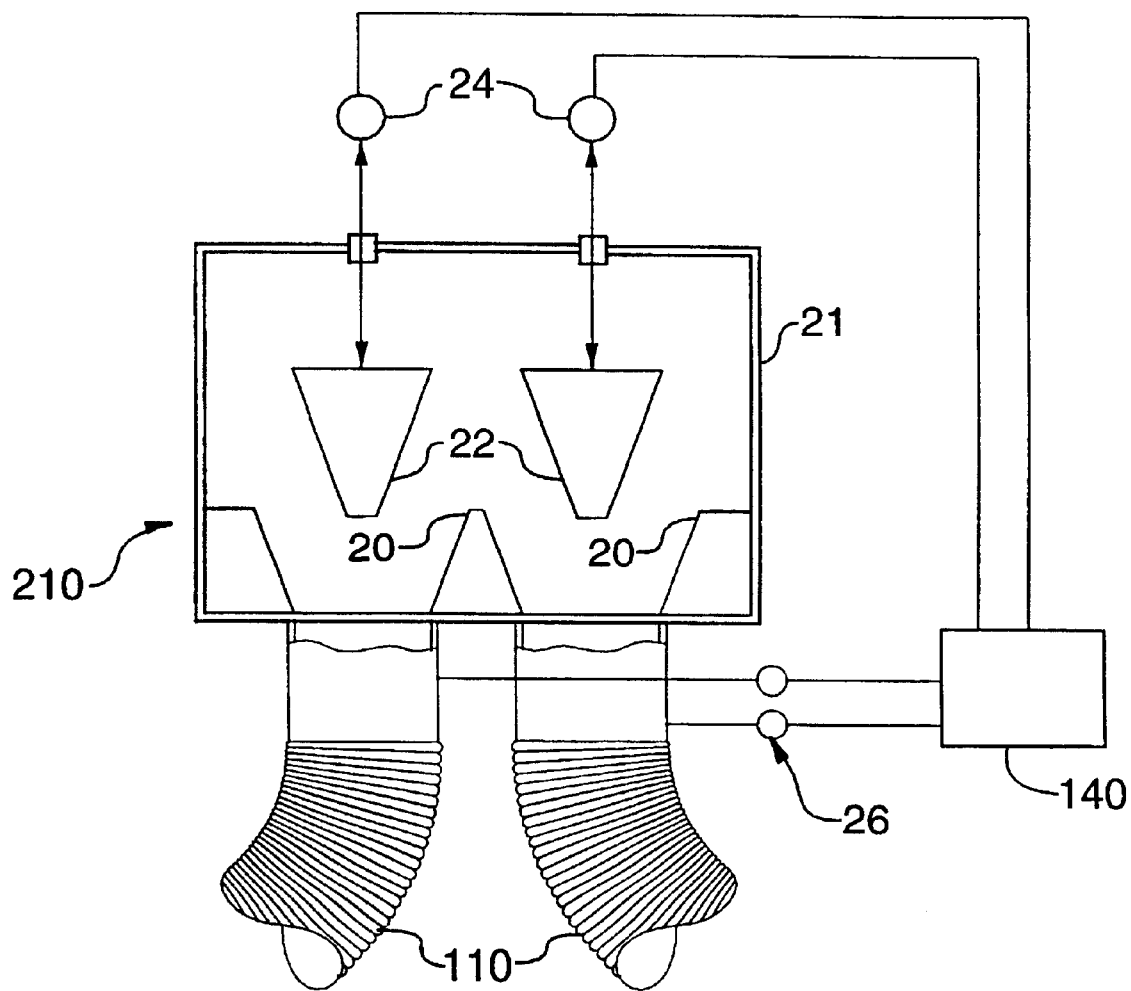
FIG. 2B is a schematic view of the compensation valve and associated control means.

As is shown in FIGS. 1 to 2B, the system 1 according to the invention includes one or more shot blast hoods 100 each connected to a vacuum hose 110 and one or more shot blast media supply hoses 120. The one or more shot blast supply hose is positioned within the hood 100 to supply shot blast media via one or more nozzles 105, which preferably may scan back and forth or from side to side within the hood. The shot blast hood is movable along a surface 10 to be treated. Shot blast media is supplied from a shot blast media container 600 via the one or more shot blast media supply hoses 120. Each vacuum hose 110 collects the shot blast media, chips, dust, and other debris, and is connected to a displacement chamber 200. A peripheral seal 130 is arranged around the edges of each hood 100 which contacts the surface 10 to be treated. Several vacuum hoses may be connected to the displacement chamber, so that shot blasting may take place simultaneously at several different locations.

The vacuum hose 110 is connected to the displacement chamber 200 via a compensation valve 210, as shown in FIG. 2B, which maintains the desired pressure if multiple vacuum hoses are in use. The compensation valve is generally as described in U.S. Pat. No. 5,566,421 granted to the present inventor; where the vacuum hoses enter the displacement chamber 200, seats 20 are provided in a manifold 21, which may be conveniently located immediately adjacent the displacement chamber, although the precise location is obviously not critical. Plungers 22 are moveable towards and away from the seats by linear actuators 24, to vary the size of the openings into the displacement chamber, so as to control the airflow through the openings. Each vacuum hose 110 has a vacuum sensor 26 connected to sense the pressure, and the signals from the sensors are fed to an automatic control means 140. The automatic control means is programmed to move the dampers 22 to their optimum positions for the sensed pressures, to balance the airflow through the vacuum hoses, for optimum system performance. For example, if a particular vacuum hose 110 is not being called upon to collect any material, or less material than another vacuum hose, much more air will be drawn through that vacuum hose than is desirable. This will be reflected in the pressure sensed by the sensor 26 for that vacuum hose. In response to that pressure, the automatic control means 140 will send a signal to the appropriate linear actuator 24 to move the plunger 22 to close down the opening to that vacuum hose to a point where the pressures are equalized.

Although the preferred embodiment employs conical plungers 22 or stoppers which are movable towards and away from corresponding seats 20, as described above, it should be appreciated that any suitable means could be employed to close down the opening size, such as an iris valve, a sliding plate, or any other desirable means. It should also be clearly understood that although only two and three vacuum hoses 110 are illustrated, the principle of the invention may be readily applied to a system with any number of vacuum hoses.

Within the displacement chamber 200, at least one inlet baffle 220 is positioned to direct the incoming airstream downwardly, thus directing most of the debris downwardly. The air is drawn out of the displacement chamber, preferably from the top of the displacement chamber, via at least one outlet baffle 225 and via at least one outlet 226. The air is led through a first duct 230 to a plurality of high performance filter units, preferably a first filter unit 300 and a second filter unit 310. A blower unit 400 provides negative pressure to the entire system, including the displacement chamber 200 and the hood 100. The air carries most of the dust and "fines" which are particularly hazardous to health.

FIG. 2A shows the automatic control means 140, such as a programmable logic controller, which is connected to a vacuum sensor 150 arranged on the shot blast hood 100 to measure the relative vacuum level inside the hood. A vacuum relief valve 160 is opened by the control means in case the seal around the hood is too tight, to cause the vacuum inside the hood to increase above a certain preset maximum value. The vacuum relief valve thus operates as a safety valve. If the pressure is too high, i.e. the suction is not high enough, inside the hood, the compensation valve 210 corresponding to the actual vacuum hose 110 will be opened a certain amount by the automatic control means 140 to restore the necessary vacuum.

Figure 3:
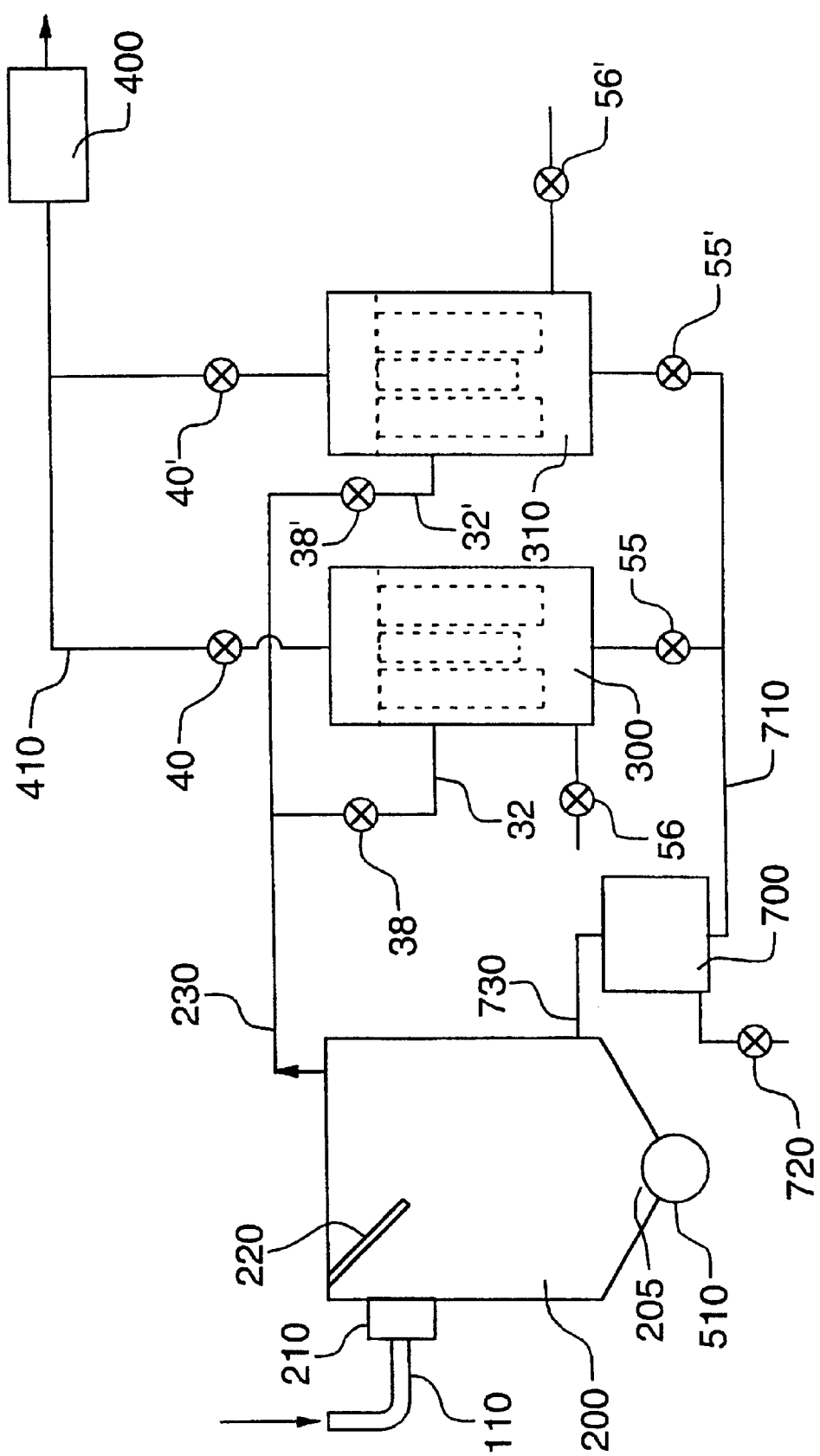
FIG. 3 is a schematic view of the displacement chamber and the associated filters.
Figure 4:
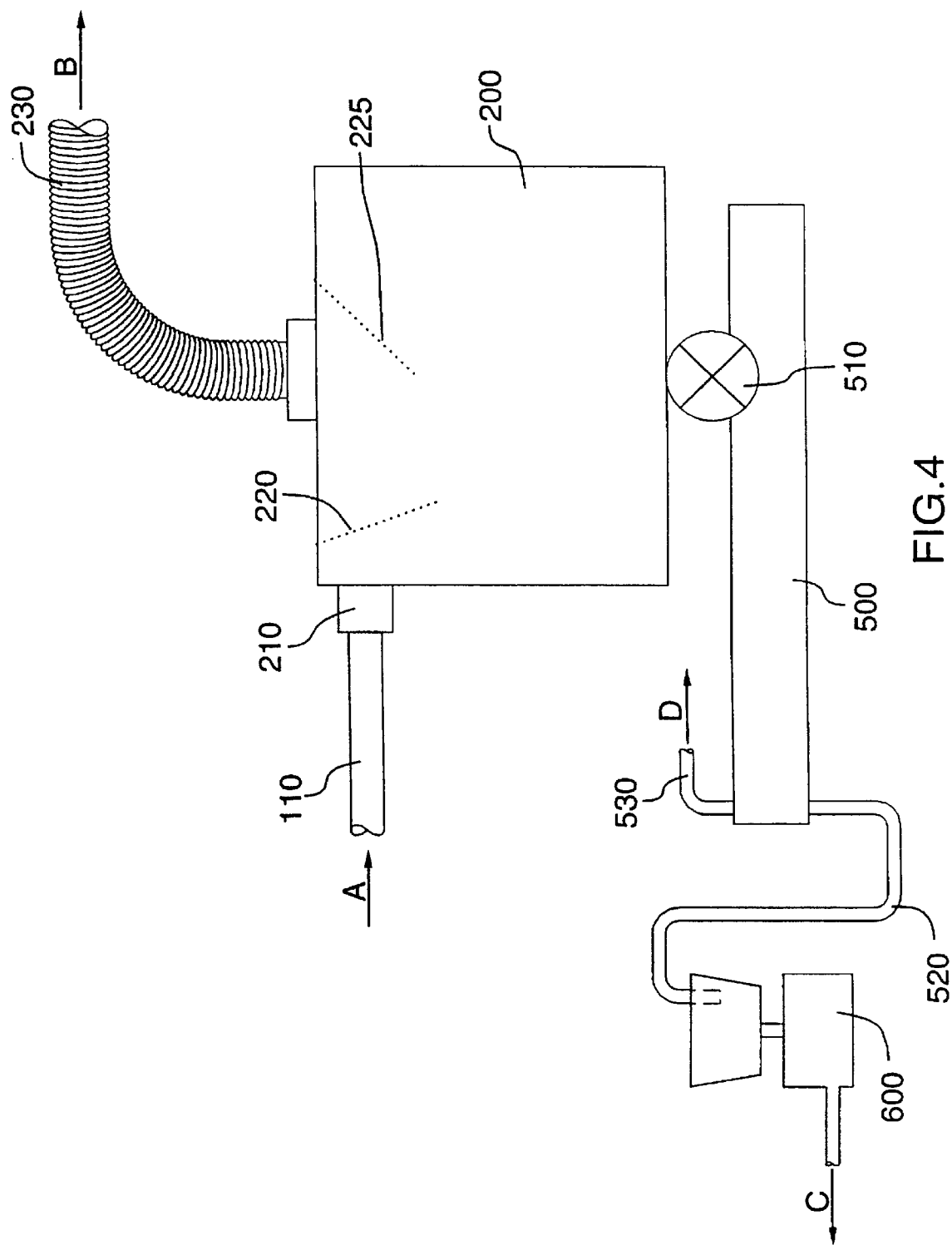
FIG. 4 is a schematic view of the displacement chamber, vibratory screen separator and blast media container.

As is shown in FIGS. 3 and 4, the used shot blast media and heavy paint chips, etc. are discharged to a vibratory screen separator 500 via a rotary valve 510 arranged at a solid matter collecting and discharging area 205 at the bottom of the displacement chamber 200. The vibratory screen separator separates the larger particles, such as paint chips or rust, from the shot blast media, so that the shot blast media may be reused. The shot blast media is removed from the vibratory screen separator 500 via a separator fines outlet 520, which is connected to the shot blast media container 600. The paint chips, and other larger pieces, are removed via a separator coarse outlet 530 and bagged for disposal. In FIG. 4, A designates the incoming vacuumed material from the shot blast hood, B designates the air/fines mixture sucked through to the first filter unit 300 or the second filter unit 310, C designates the re-useable blast media coming from the blast media container 600 and D designates the coarser material left over from the vibratory screen separator 500.

From the displacement chamber 200, the dust-laden air is drawn to one of the filter units 300, 310, as designated by B in FIG. 4. Each filter unit preferably includes several HEPA filters mounted vertically within a housing. Air is drawn through the filter units via a blower duct 410 leading from the clean side of the filter units to the blower unit 400. As is shown in FIG. 2, the displacement chamber 200 is connected to the first filter unit 300 and the second filter unit 310 via the first duct 230. The first duct is divided into a first inlet duct 32, leading to the first filter unit, and a second inlet duct 32' leading to the second filter unit. A first inlet valve 38 is arranged in the first inlet duct and a second inlet valve 38' is arranged in the second inlet duct, to make it possible to open or close the respective inlet duct. Each filter unit is connected to the blower 400 via the blower duct 410 and the connection to the first filter unit 300 can be opened or closed using a first blower valve 40 whilst the connection to the second filter unit 310 can be opened or closed using a second blower valve 40'. The bottom of each filter unit is connected to a common paint and dust filter 700 via an outlet duct 710 and the connection to the first filter unit 300 can be opened or closed using a first outlet valve 55 whilst the connection to the second filter unit 310 can be opened or closed using a second outlet valve 55'. The first filter unit has a first air inlet valve 56 and the second filter unit 310 has a second air inlet valve 56', to permit the controlled inflow of outside air into the respective filter unit. The paint and dust filter 700 is connected to the displacement chamber 200 via a suction duct 730. The vibratory separator 500 comprises a separator fines outlet 520, through which the shot blast media is removed from the vibratory screen separator. The separator fines outlet is connected to the shot blast media container 600. A separator coarse outlet 530, through which larger pieces, such as paint chips, are removed and bagged for disposal, is also arranged on the vibratory separator 500.

When the filters in the first filter unit 300 start to become clogged, as can be readily detected by means (not shown) which measure the pressure drop across the filters, the filter unit is taken off-line by closing the first inlet valve 38, and the airstream is directed through the second filter unit 310 by opening the second blower valve 40' and the second inlet valve 38'. The first blower valve 40 is then closed to halt the suction of air through the first filter unit 300 by the blower 400. Once the first filter unit is off-line, the first outlet valve 55 is opened from the bottom of the first filter unit where much of the dust will have settled, to draw the dust to the paint and dust filter 700, which is connected between the first and second filter units 300 and 310, respectively, and the displacement chamber 200. The paint and dust filter uses the negative pressure in the displacement chamber to draw the dust from the first filter unit through the paint dust filter. The first air inlet valve 56 on the first filter unit 300 is opened to allow air into the first filter unit so that the dust can be drawn to the paint and dust filter 700. Once the first filter unit has been cleaned in this manner, the first outlet valve 55 to the paint and dust filter 700 is closed, and the dust can be removed from the paint and dust filter via the third outlet valve 720, which is preferably located at the bottom of the paint and dust filter.

As the second filter unit becomes clogged, this process is repeated, but this time with the second filter unit being taken off-line and connected to the paint and dust filter while the first filter unit is back on-line. Thus, when the filters in the second filter unit 310 start to become clogged, as can be readily detected by means (not shown) which measure the pressure drop across the filters, the filter unit is taken off-line by closing the second inlet valve 38', and the airstream is directed through the first filter unit 300 by opening the first blower valve 40 and the first inlet valve 38. The second blower valve 40' is then closed to halt the suction of air through the second filter unit 310 by the blower 400. Once the second filter unit is off-line, the second outlet valve 55' is opened from the bottom of the second filter unit where much of the dust will have settled, to draw the dust to the paint and dust filter 700. The paint and dust filter uses the negative pressure in the displacement chamber to draw the dust from the second filter unit through the paint dust filter. The second air inlet valve 56' on the second filter unit 310 is opened to allow air into the second filter unit so that the dust can be drawn to the paint and dust filter 700. Once the second filter unit has been cleaned in this manner, the second outlet valve 55' to the paint and dust filter 700 is closed, and the dust can be removed from the paint and dust filter via the third outlet valve 720.

Figure 5:
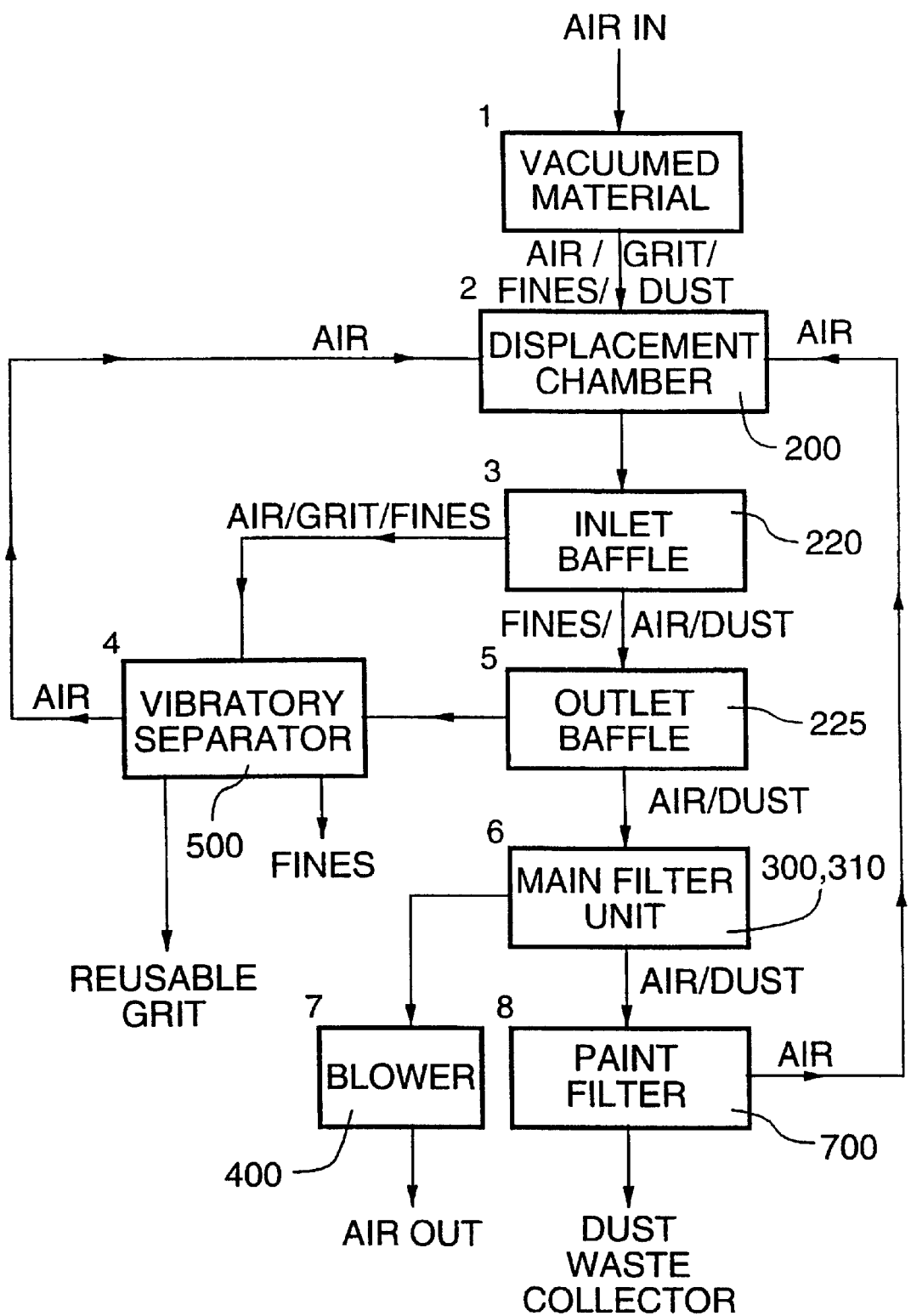
FIG. 5 is a flow diagram of a system according to the invention.

FIG. 5 is a flowchart, which illustrates the operation of the system. Box 1 illustrates the vacuumed material from the shot blast hood. This material comprises blast media (grit), paint flakes/chips/particles, rust particles and the carrier gas (preferably air). The vacuumed material is sucked into the displacement chamber 200, as illustrated in Box 2. Inside the displacement chamber, the vacuumed material hits the one or more inlet baffles 220 and the heavier particles, such as the blast media and larger paint particles, are deflected towards the bottom of the displacement chamber, which is illustrated in Box 3. The heavier particles are transported to the vibratory screen separator 500. Box 4 illustrates the separation of non-usable particles from the re-useable blast media, which takes place in the vibratory screen separator. The finer particles which remain suspended in the displacement chamber 200 will be sucked out of the displacement chamber via at least one outlet baffle 225, so that the relatively large particles still suspended will fall towards the bottom of the displacement chamber, as illustrated in Box 5. Box 6 illustrates how the finer particles will be sucked into eitherthe first filter unit 300 or the second filter unit 310, depending on which filter unit is in operation and which one is being regenerated, by the blower 400 (illustrated by Box 7). In Box 8, the paint and dust filter 700 is illustrated. The toxic particles, which have been trapped in one of the filter units 300, 310 will be led to the paint and dust filter where they will be further filtered so that the toxic waste volume will be as low as possible.

Figure 6A:
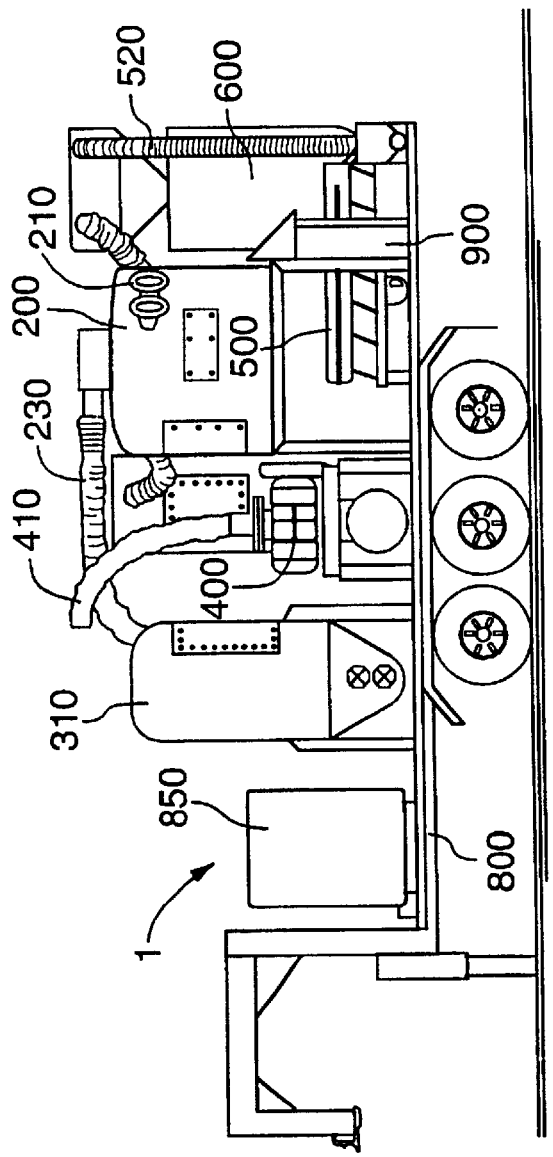
FIG. 6A is a schematic side view of a system according to the invention, mounted on a mobile trailer.
Figure 6B:
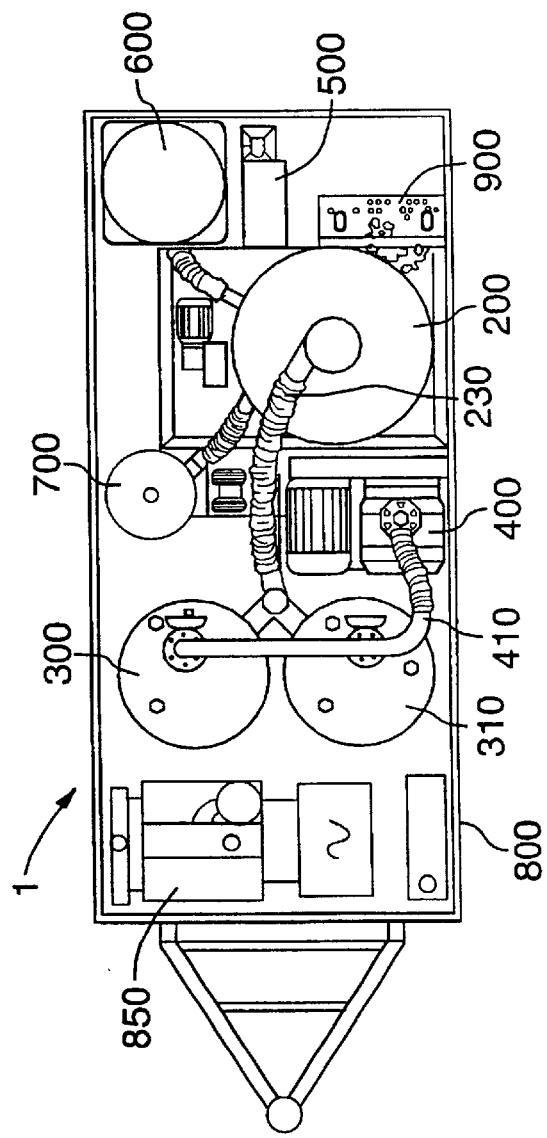
FIG. 6B is a schematic top view of a system according to the invention, mounted on a mobile trailer.

FIGS. 6A and 6B show a system 1 according to the invention mounted onto a mobile trailer 800. The whole system may be manufactured small enough to fit a relatively small space. The reference numerals correspond to those used for FIGS. 1 to 5, and refer to the same technical features. A mobile power generator 850 may be used to provide the system 1 with electric power. Furthermore, a central control pulpit 900 is provided, to facilitate the operation and surveillance of the system by an operator. The mobile trailer 800 is preferably provided with an enclosure (not shown for clarity reasons), which acts as weather protection for the system 1.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, the gas stream has been described as being an air stream, but in certain special cases a non-oxidizing gas atmosphere may be desirable or necessary. Such inert gas may be nitrogen gas or a noble gas. In other cases, hydrogen gas may be used. Furthermore, the used blast media, rust flakes and dust particles leaving the displacement chamber may be treated in any suitable separator, the preferred type of separator being a vibratory screen separator as shown in the drawings. The filter units have been shown as a pair, but any number of filter units may be used, as long as there are at least two filter units.

Industrial Applicability

The invention relates to systems for separating toxic particles from shot blast media and the recycling of the shot blast media for shot blast cleaning of surfaces.

What is claimed as the invention is:

1. A system (1) for shot blasting of a surface, collecting used shot blast media and debris, and separating the debris from the shot blast media, said system comprising:
    at least one shot blast nozzle (105) having a hood (100) positionable against a surface (10) to be treated, each hood being connected to a vacuum hose (110), which collects the shot blast media, chips, dust, and other debris present in said shot blast hood during the shot blasting operation;
    a displacement chamber (200) having at least one inlet connected to said hood (100) by said vacuum hose (110), at least one inlet baffle (220) positioned to direct the incoming gas stream downwardly, a solid matter collecting and discharging area (205) at the bottom thereof for receiving solid matter which falls from said gas stream in said displacement chamber, at least one outlet baffle (225), positioned to force an outgoing gas stream to a first downwardly direction followed by an upwards/outwards direction, at least one outlet (226) for said outgoing gas stream, and a rotary valve (510) arranged at the bottom of said displacement chamber for allowing discharge of said solid matter;
    a first filter unit (300) and a second filter unit (310) connected to said displacement chamber (200) via a first duct (230), said filter units being arranged so that one unit is filtering the gas stream coming from said displacement chamber while the other unit is regenerated, the two filter units alternately filtering and regenerating, respectively;
    a shot blast media container (600) connected to at least one shot blast media feeding hose (120), which is connected to said at least one shot blast nozzle (105);
    a blower (400) for creating suction of said gas stream from said shot blast nozzle (105) to said displacement chamber (200), through said first filter unit (300) and said second filter unit (310);
    wherein said system (1) further comprises:
        a vibratory screen separator (500) arranged adjacent said rotary valve (510) of said displacement chamber (200) so that heavier particles, such as used shot blast material and heavy paint chips, may be discharged from the bottom of said displacement chamber to said vibratory screen separator when said rotary valve is opened, said vibratory screen separator being arranged to separate used shot blast media from larger particles, and
        a paint and dust filter (700), which is connected between said first and second filter units (300, 310) and said displacement chamber (200), for filtering the filtrate from either said first filter unit or said second filter unit, said paint and dust filter using said blower suction from said displacement chamber to suck said filtrate from said first filter unit or said second filter unit, respectively.

2. System (1) as recited in claim 1, in which said vibratory separator (500) comprises
    a separator fines outlet (520), through which the shot blast media is removed from said vibratory screen separator, said separator fines outlet being connected to said shot blast media container (600), and
    a separator coarse outlet (530), through which larger pieces, such as paint chips, are removed and bagged for disposal.

3. System (1) as recited in claim 1, in which said rotary valve (510) is pressure sealed to prevent ambient air ingress into said displacement chamber (200) via said rotary valve when said rotary valve is closed.

4. System (1) as recited in claim 1, in which
    said displacement chamber (200) is connected to said first filter unit (300) and said second filter unit (310) via a first duct (230), which is divided into a first inlet duct (32), leading to said first filter unit, and a second inlet duct (32') leading to said second filter unit;
    a first inlet valve (38) is arranged in said first inlet duct (32) and a second inlet valve (38') is arranged in said second inlet duct (32'), to make it possible to open or close the respective inlet ducts;
    said first filter unit (300) and said second filter unit (310) are connected to said blower (400) via a blower duct (410), and the blower connection to the first filter unit can be opened or closed using a first blower valve (40) arranged in said blower duct, and the blower connection to said second filter unit can be opened or closed using a second blower valve (40') arranged in said blower duct;
    the bottoms of each of said filter units (300, 310) are connected to a common paint and dust filter (700) via an outlet duct (710), and the common paint filter connection to the first filter unit is opened or closed using a first outlet valve (55) and the common paint filter connection to the second filter unit is opened or closed using a second outlet valve (55');
    said first filter unit (300) has a first air inlet valve (56) and said second filter unit (310) has a second air inlet valve (56'), to permit the controlled inflow of outside air into the respective filter unit; and
    said paint and dust filter (700) is connected to said displacement chamber (200) via a suction duct (730).

5. System (1) as recited in claim 4, in which said paint and dust filter (700) has a third outlet valve (720), preferably located at the bottom of said paint and dust filter, through which dust is removed from said paint and dust filter.

6. System (1) as recited in claim 1, in which said system comprises at least two said shot blast nozzles (105) having a hood (100), each of said at least two shot blast nozzles being connected to said displacement chamber (200) via a respective vacuum compensation valve (210), with which the pressure in said respective vacuum hose (110) is regulated by pressure sensors (26) connected to sense the pressure in each said vacuum hose, dampers (22) operable in response to the relative pressures between said vacuum hoses so as to vary the effective area of the respective connections between said vacuum hoses and said displacement chamber in order to equalize and optimize the relative pressures, and automatic control means (140) to so operate said dampers in response to said sensed pressures.

\* \* \* \* \*